(No Model.)
A. C. VAUGHAN.
NUT LOCK.
No. 389,027. Patented Sept. 4, 1888.
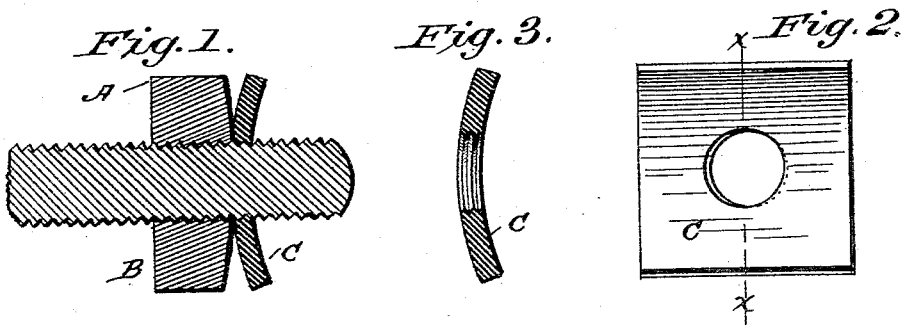
WITNESSES:
Fred G. Dieterich,
Edw. W. Byrn.
INVENTOR.
A. C. Vaughan
BY Munn & Co
ATTORNEY.

UNITED STATES PATENT OFFICE.

AARON C. VAUGHAN, OF SHANE'S CROSSING, OHIO.

NUT-LOCK.

SPECIFICATION forming part of Letters Patent No. 389,027, dated September 4, 1888.

Application filed May 26, 1888. Serial No. 275,192. (No model.)

*To all whom it may concern:*

Be it known that I, AARON C. VAUGHAN, of Shane's Crossing, in the county of Mercer and State of Ohio, have invented a new and useful Improvement in Nut-Locks, of which the following is a specification.

My invention is in the nature of an improved nut-lock designed to clamp the bolt by its own elasticity just outside of the regular nut, and thus hold the latter against accidental displacement.

It consists in a supplemental nut made of steel about one eighth of an inch thick, which is first threaded with a regular thread and is then stamped or rolled to a curvature which makes a corresponding curvature in the pitch of the threads, which causes this nut to bind or pinch the bolt when turned on the same independently of any bearing against the other nut, washer, or bearing-plate, as hereinafter fully described.

Figure 1 is a sectional view of my improved nut-lock applied to an ordinary nut and bolt. Fig. 2 is a view of the convex face of the curved nut. Fig. 3 is a section of the same through line $x$ $x$ of Fig. 2.

A is an ordinary bolt, and B an ordinary nut, to which is applied my improved form of nut-lock C. This latter is made of steel about one-eighth of an inch thick. This nut is punched with a hole in its center, and that hole is then threaded with a regular standard thread, in the usual way. After the nut is thus formed, I bend it in one of its cross-sectional planes by stamping it (or pressing it between rollers) into a curved form. This action throws the threads of the nut into a corresponding deviation from their regular plane, as shown in Fig. 3, and this causes the nut to bind on the bolt from the time it is first started on the bolt.

In applying my nut-lock its convex side is placed next to the nut which it is to lock in place, and in this position its outwardly-curled edges project far enough to allow the wrench to readily take hold of the nut-lock.

The advantages of this nut-lock are to be found in its great cheapness and simplicity. Practical tests have demonstrated its efficiency, and as its thread is continuous it does not cut or mutilate the threads of the bolt.

In constructing the curved nut it is immaterial as to the direction of curvature—*i. e.*, it may be from side to side, as shown, or from corner to corner.

Having thus described my invention, what I claim as new, and desire to secure by Letters Patent, is—

A nut-lock consisting of a relatively thin spring-nut having both the body of the nut and its thread curved, as described, by bending the nut after threading.

AARON C. VAUGHAN.

Witnesses:
FRANK TAYLOR,
JOSEPH L. BORCHERS.